United States Patent
Ku

(10) Patent No.: US 7,221,858 B2
(45) Date of Patent: May 22, 2007

(54) PULSE-WIDTH MODULATION MOTOR SPEED CONTROL CIRCUIT

(75) Inventor: Chin-Long Ku, Guangdong (CN)

(73) Assignee: Foxconn Technology Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 11/308,608

(22) Filed: Apr. 11, 2006

(65) Prior Publication Data

US 2007/0019934 A1    Jan. 25, 2007

(30) Foreign Application Priority Data

Jul. 22, 2005    (CN)    ............... 2005 2 0061963

(51) Int. Cl.
*H02P 7/29*    (2006.01)

(52) U.S. Cl. ............... 388/811; 318/249; 318/439; 318/480; 363/41; 363/52

(58) Field of Classification Search ............... 318/480, 318/439, 249, 254; 363/41; 8/158, 159; 388/811

See application file for complete search history.

(56) References Cited

U.S. PATENT DOCUMENTS

| | | | |
|---|---|---|---|
| 4,283,658 A * | 8/1981 | Parker | 315/117 |
| 4,587,605 A * | 5/1986 | Kouyama et al. | 363/41 |
| 4,992,709 A * | 2/1991 | Griffin | 318/249 |
| 5,313,150 A * | 5/1994 | Arakawa et al. | 318/768 |
| 5,408,073 A * | 4/1995 | Jeong | 219/623 |
| 6,112,546 A * | 9/2000 | Kim | 62/440 |
| 6,661,681 B2 * | 12/2003 | Nakamura | 363/56.03 |
| 6,737,860 B2 * | 5/2004 | Hsu et al. | 324/161 |
| 6,748,618 B1 * | 6/2004 | Darby et al. | 8/159 |
| 7,028,511 B2 * | 4/2006 | Cheyne | 68/12.16 |
| 7,106,019 B2 * | 9/2006 | Becerra et al. | 318/439 |
| 2001/0015578 A1 * | 8/2001 | Westlake | 307/125 |
| 2002/0117986 A1 * | 8/2002 | Becerra et al. | 318/480 |
| 2002/0163820 A1 * | 11/2002 | Nakamura | 363/56.03 |
| 2003/0020460 A1 * | 1/2003 | Hsu et al. | 324/161 |
| 2004/0078902 A1 * | 4/2004 | McGill et al. | 8/158 |
| 2004/0083554 A1 * | 5/2004 | Cheyne | 8/158 |
| 2004/0084640 A1 * | 5/2004 | Cheyne et al. | 250/551 |
| 2004/0088797 A1 * | 5/2004 | Darby | 8/159 |
| 2005/0253744 A1 * | 11/2005 | Kern | 341/110 |

* cited by examiner

*Primary Examiner*—Paul Ip
(74) *Attorney, Agent, or Firm*—Winston Hsu

(57) ABSTRACT

A PWM motor speed control circuit (10) includes a PWM signal generator (20), a driver integrated circuit (IC) (101) and a photocoupler (30) coupled between the PWM signal generator and the driver IC. The photocoupler receives an original PWM signal generated by the PWM signal generator and outputs a new PWM signal in response to the original PWM signal, wherein a voltage parameter of the original PWM signal is isolated by the photocoupler from a voltage parameter of the new PWM signal. The new PWM signal is fed to the driver IC and used for controlling speed of a motor (100).

14 Claims, 3 Drawing Sheets

PULSE-WIDTH MODULATION MOTOR SPEED CONTROL CIRCUIT

FIELD OF THE INVENTION

The present invention relates generally to motor speed control, and more particularly to a pulse-width modulation (PWM) motor speed control circuit for controlling speed of a direct current (DC) brushless motor.

DESCRIPTION OF RELATED ART

It is well known that motors are widely used to drive a number of devices or machines such as cooling fans, hard disc drives, water pumps, etc. As a DC brushless motor is used to drive a cooling fan, the speed of the fan motor is often expected to be controllable for the purpose of conserving electric energy. For instance, if the cooling fan is used to cool a central processing unit (CPU) of a computer system, the fan motor is generally required to operate at its full speed when the CPU overheats, while when the CPU is already cooled down or in a stand-by mode, the rotational speed of the fan motor should lower in order to save energy. Regulating the speed of the fan motor also increases fan longevity, and decreases noise caused by unnecessarily high airflow.

Currently, pulse-width modulation (PWM) motor speed control technology is a widely used method of controlling motor speed. In the PWM technique, a PWM signal in the form of a series of pulses is sent to the motor being controlled. The PWM signal determines the electrical power actually supplied to the motor, which in turn controls the rotational speed of the motor. In particular, the motor's speed is regulated by controlling the width (duration) of the pulses. When the pulse has a wide width (duration), the motor speed is correspondingly high. When the pulse's width decreases, the motor speed correspondingly decreases.

As the PWM technique is applied to control the rotational speed of the fan motor mentioned above, the PWM signal as used to control the speed of the fan motor is typically generated from the printed circuit board (PCB) of the computer system, wherein the CPU is mounted on the PCB. The generated PWM signal is a voltage signal. For different kinds of PCBs, however, the voltage parameter of the PWM signal may be different. For example, the PWM signal generated from some kinds of PCBs may have a maximum voltage of 3.3 V, 5 V, 12 V or other possible voltages. On the other hand, the voltage adopted by different fan motors may also be different. For example, fan motors using voltage of 5 V, 8 V, 12 V, 24 V or 48 V are currently available.

As the PWM signal is used to control the speed of the fan motor, the voltage of the PWM signal should be consistent with the voltage adopted internally by the fan motor. Unless the voltage parameters of the PWM signal are already known, the fan motor is required to accommodate all of the possible voltage variables, i.e., 3.3 V, 5 V or 12 V, as mentioned above. Otherwise, a problem of voltage mismatching between the PWM signal and the fan motor can be raised, which in turn may cause damage to the fan motor or render the PWM signal ineffective in controlling the fan motor's speed.

Furthermore, if the PWM signal generated from the PCB is directly fed to the fan motor, noise in the PWM signal may affect the fan motor. On the other hand, if, for some reason(s), an abnormal voltage is brought about within the fan motor, such abnormal voltage may be sent back directly to the PCB and accordingly cause damage to sensitive electronic parts mounted in the PCB.

Therefore, it is desirable to provide a PWM motor speed control circuit to control motor speed wherein one or more of the foregoing disadvantages may be overcome or at least alleviated.

SUMMARY OF INVENTION

An embodiment of the present PWM motor speed control circuit includes a PWM signal generator, a driver integrated circuit (IC) and a photocoupler coupled between the PWM signal generator and the driver IC. The photocoupler receives an original PWM signal generated by the PWM signal generator and outputs a new PWM signal in response to the original PWM signal, wherein a voltage parameter of the original PWM signal is isolated by the photocoupler from a voltage parameter of the new PWM signal. The new PWM signal is fed to the driver IC and used for controlling speed of a motor.

Other advantages and novel features of the present invention will become more apparent from the following detailed description of preferred embodiment when taken in conjunction with the accompanying drawings, in which:

DETAILED DESCRIPTION

Figure 1:
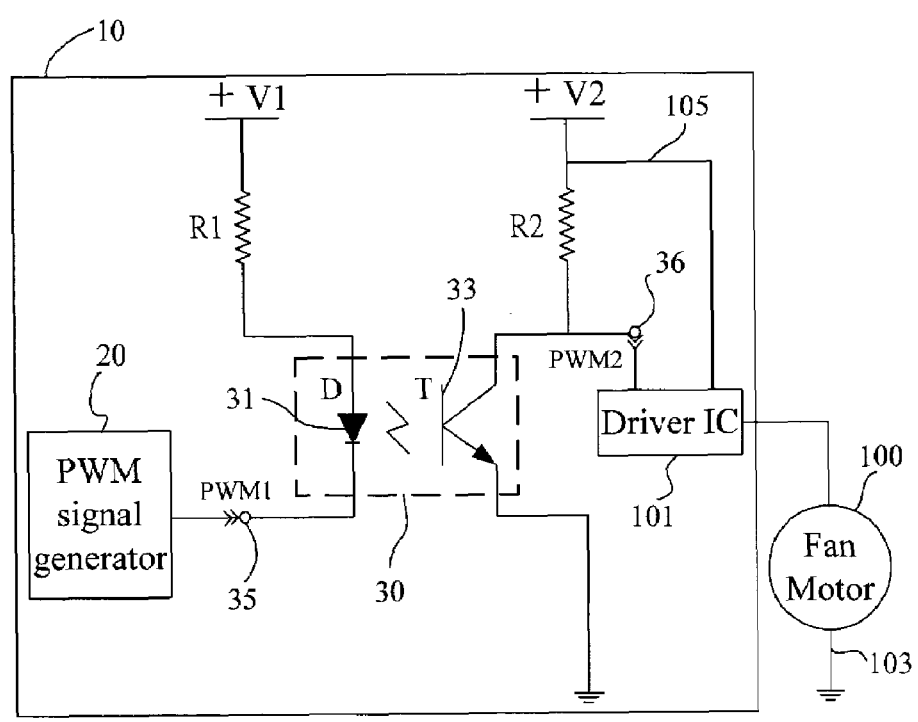
FIG. 1 is a circuit diagram of a PWM motor speed control circuit in accordance with an embodiment of the present invention.

FIG. 1 illustrates a circuit diagram of a PWM motor speed control circuit 10 in accordance with an embodiment of the present invention. The control circuit 10 employs a speed control signal (i.e., PWM signal) to control speed of a motor, which in this embodiment is a DC brushless fan motor 100 and is coupled to the control circuit 10. The control circuit 10 includes a PWM signal generator 20, a driver integrated circuit (IC) 101 of the fan motor 100, and a photocoupler 30 electrically coupled between the PWM signal generator 20 and the driver IC 101. Typically, the PWM signal generator 20 is located at a distance from the fan motor 100. For example, as the fan motor 100 functions as a cooling fan for cooling a central processing unit (CPU) in a computer system (not shown), the PWM signal generator 20 may be a PWM signal generating integrated circuit (IC) in the printed circuit board (PCB) of the computer system.

The photocoupler 30 is a unitary electronic component in which a light-emitting diode (D) 31 and a phototransistor (T) 33 are packaged together. The photocoupler 30, which is coupled between the PWM signal generator 20 and the driver IC 101 of the fan motor 100, has an input terminal 35 coupled to the PWM signal generator 20 and an output terminal 36 coupled to the driver IC 101 of the fan motor 100. An anode (not labeled) of the light-emitting diode 31 is coupled to a first voltage source V1 via a first resistor R1. A cathode (not labeled) of the light-emitting diode 31 is coupled to the input terminal 35 of the photocoupler 30. In the illustrated embodiment, an emitter (not labeled) of the phototransistor 33 is coupled to ground. A collector (not labeled) of the phototransistor 33 is coupled to the output terminal 36 of the photocoupler 30. The collector is also coupled to a second voltage source V2 via a second resistor R2. The fan motor 100 has a first power terminal 103 coupled to ground and a second power terminal 105 coupled to the second voltage source V2.

The second voltage source V2 is the voltage supplied to the fan motor 100, which may be 5 V, 8 V, 12 V, 24 V, 48 V, etc. The first voltage source V1, which is used to control the light-emitting diode 31, is typically based on a threshold voltage of the light-emitting diode 31 (i.e., the voltage drop at the diode 31) and the voltage parameter of the PWM signal generated by the PWM signal generator 20. As noticed above, the PWM signal is a voltage signal, and, if generated from PCB, may have a maximum voltage of 3.3 V, 5 V or 12 V, depending on the type of PCB being used. For clarity, the light-emitting diode is presumed to have a threshold voltage of 1.5 V to 1.7 V. In order for the light-emitting diode 31 to be nonconductive when the PWM signal transmitted to the light-emitting diode 31 is at its peak voltage (e.g., 3.3 V, 5 V or 12 V), the first voltage source V1 may have a voltage of 4.5 V to 5.0 V, as will be discussed in further detail below. It should be understood, however, that the present invention is not limited to the use of these particular voltages. In fact, it is expected that the present invention may be used with a wide range of voltages depending on the PCB, light-emitting diode, and the motor.

Figure 2:
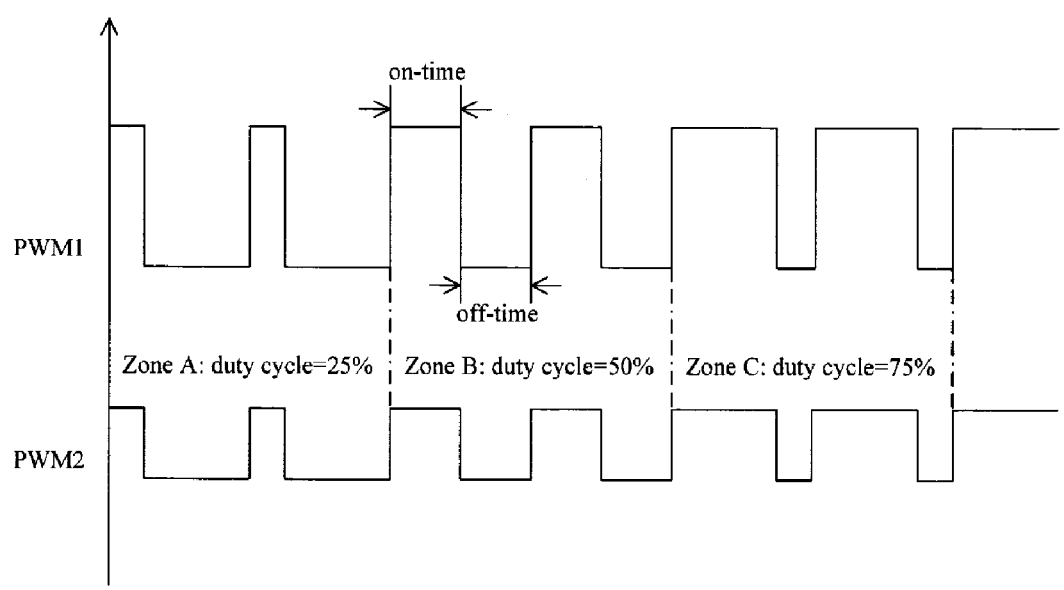
FIG. 2 is a graph showing two PWM signals—the original PWM signal (PWM1) and the new PWM signal (PWM2)

The principle and operation of the control circuit 10 will be explained with reference to FIG. 2. The PWM signal generator 20 firstly generates an original PWM signal (PWM1) in response to, for example, the temperature of the CPU being cooled by the fan motor 100. The original PWM1 signal includes a series of pulses with varying pulse width. For illustrative purpose, these pulses are divided into three zones A, B and C, with each zone having two pulses therein. For each PWM pulse, it includes a first pulse section in which the pulse level is high (on-time) and a second pulse section in which the pulse level is low (off-time). The sum of these two times is one period. The ratio of the time in which the pulse is at "on-time" to the period of the pulse is referred to as "duty cycle." The pulses with different pulse widths have different duty cycles. For example, in reference to the original PWM1 signal, as the pulse width increases, each pulse in zones A, B, C has a duty cycle of 25%, 50% and 75%, respectively. That is, the duty cycle of a particular pulse varies with change in pulse width (duration) thereof.

As mentioned above, the PWM signal generator 20 modifies the duty cycle (i.e., the pulse width) of the original PWM1 signal in response to the temperature of the CPU currently being cooled by the fan motor 100. The PWM signal generator 20 detects the temperature of the CPU and generates PWM pulses having a duty cycle that corresponds the detected temperature. If the detected temperature is relatively low, the PWM signal generator 20 generates PWM pulses having a relatively low duty cycle (e.g., the pulses in zone A). If the detected temperature is relatively high, the PWM signal generator 20 accordingly generates PWM pulses having a relatively high duty cycle (e.g., the pulses in zone C), in order to increase the speed of the fan motor 100.

Since the voltage parameter of the original PWM1 signal may be different from the voltage (i.e., the second voltage source V2) adopted by the fan motor 100, the photocoupler 30 in the control circuit 10 is typically used to isolate the voltage parameter of the original PWM1 signal, as will be described below. Firstly, the original PWM1 signal is fed from the PWM signal generator 20 to the photocoupler 30 via the input terminal 35. Through the photocoupler 30, the original PWM1 signal is converted into a new PWM signal (PWM2), which has a waveform similar to the original PWM1 signal, as illustrated in FIG. 2. Specifically, for each pulse of the original PWM1 signal, when the pulse is at a logic-low (i.e., off-time), the light-emitting diode 31 conducts and emits light due to the first voltage source V1, and as a result, the phototransistor 33 is turned on. Accordingly, the output terminal 36 outputs a logic-low since the output terminal 36 is connected to ground at this moment. On the other hand, when the pulse is at a logic-high (i.e. on-time, which may be 3.3 V, 5 V or 12 V), the light-emitting diode 31 cuts off (i.e., becomes nonconductive) since the light-emitting diode 31 has a threshold voltage of 1.5 V to 1.7 V, as noticed above. Accordingly, the phototransistor 33 is turned off, and the output terminal 36 outputs a logic-high due to the second voltage source V2. As a result, the new PWM2 signal has a waveform that is similar to that of the original PWM1 signal, and for each pulse, the new PWM2 signal has a duty cycle that is the same as that of a corresponding pulse of the original PWM1 signal, as shown in FIG. 2. In other words, the new PWM2 signal and the original PWM1 signal are in phase and the new PWM2 signal has not changed the duty cycle of the original PWM1 signal.

Due to the presence of the photocoupler 30, the voltage of the original PWM1 signal is isolated from and therefore is not directly supplied to the fan motor 100. The photocoupler 30 operates as a voltage isolation mechanism to isolate the voltage parameter of the original PWM1 signal. For the fan motor 100, the second voltage source V2 and the second resistor R2 are internal parameters. The voltage mismatching problem in the conventional art is therefore effectively resolved. Accordingly, the fan motor 100 can be suitably applied to all kinds of PCBs. In order to control the rotational speed of the fan motor 100, the new PWM2 signal is then transmitted to the driver IC 101 of the fan motor 100. It should be noted that the driver IC 101 is well known to those skilled in the art and therefore detailed description thereof is omitted herein. In response to the new PWM2 signal, the driver IC 101 accordingly regulates the average voltage (or effective voltage) that is actually supplied to the fan motor 100, whereby the rotational speed of the fan motor 100 is controlled. The duty cycle of the pulse train of the new PWM2 signal currently being provided to the fan motor 100 determines the fan motor's speed.

Figure 3:
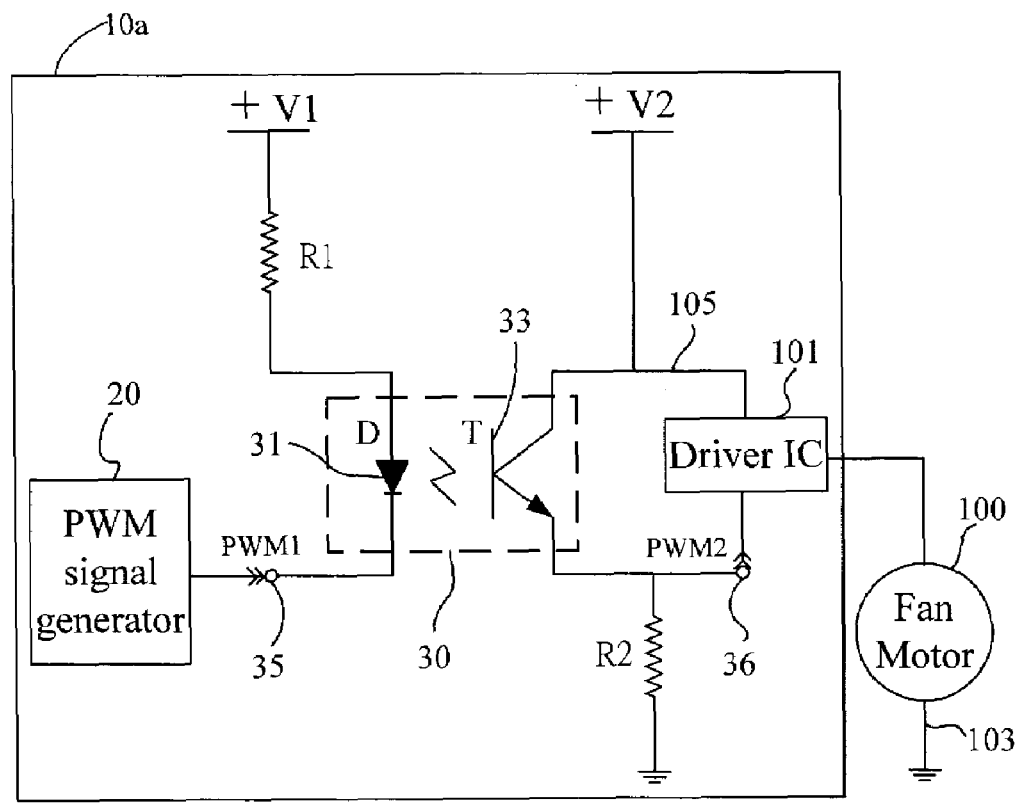
FIG. 3 is a circuit diagram of a PWM motor speed control circuit in accordance with an alternative embodiment of the present invention.

FIG. 3 illustrates a control circuit 10a in accordance with an alternative embodiment of the present invention. In the control circuit 10a, the collector of the phototransistor 33 is directly coupled to the second voltage source V2, the output terminal 36 of the photocoupler 30 is connected to the emitter of the phototransistor 33, and the second resistor R2 is coupled between ground and the emitter of the phototransistor 33. As the original PWM1 signal is inputted to the photocoupler 30, the output terminal 36 of the photocoupler 30 outputs a logic-high when a pulse of the original PWM1 signal is at a logic-low. When the pulse is at a logic-high, the output terminal 36 of the photocoupler 30 accordingly outputs a logic-low. Therefore, in this particular embodiment, the new PWM2 signal as outputted from the output terminal 36 is inverted compared to the original PWM1 signal. In other words, the new PWM2 signal and the original PWM1 signal are out of phase.

In the present control circuit 10 (10a), the voltage of the original PWM1 signal is prevented from feeding into the fan motor 100 due to the presence of the photocoupler 30. The new PWM2 signal is determined by the internal parameters (i.e., the second voltage source V2 and the second resistor R2) of the fan motor 100. The fan motor 100 is thus capable of being used with all kinds of PCBs, regardless of the voltage parameter of the original PWM1 signal generated by the PCBs. Furthermore, noise mixed in the original PWM1 signal is also isolated by the photocoupler 30, whereby the influence of the noise to the fan motor 100 is eliminated. Moreover, if an abnormal voltage occurs within the fan motor 100, this abnormal voltage does not return back to the PCB, thus avoiding damage to sensitive electronic parts in the PCB since this abnormal voltage is also isolated/stopped by the photocoupler 30. Although the present control circuit 10 is described as used to control the rotational speed of the fan motor 100, it should be noticed that the control circuit 10 may also be suitably used in other fields to control the speed of other particular motors, if desired.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pulse-width modulation (PWM) motor speed control circuit for controlling speed of a motor, comprising:
    a PWM signal generator being mounted on a circuit board of a computer system for generating an original PWM signal in response to a temperature of an electronic device mounted on the circuit board;
    a driver integrated circuit (IC); and
    a photocoupler coupled between the PWM signal generator and the driver IC, the photocoupler receiving said original PWM signal and outputting a new PWM signal in response to said original PWM signal wherein the photocoupler isolates a voltage parameter of said original PWM signal from a voltage parameter of said new PWM signal, said new PWM signal being fed to the driver IC for controlling a speed of said motor.

2. The circuit of claim 1, wherein the new PWM signal and the original PWM signal each include a plurality of pulses, each pulse of the new PWM signal has a duty cycle that is the same as that of a corresponding pulse of the original PWM signal.

3. The circuit of claim 2, wherein the PWM signal generator is a PWM signal generating integrated circuit (IC).

4. The circuit of claim 1, wherein the photocoupler is a packaged component in which a light-emitting diode and a phototransistor are packaged together, a cathode of the light-emitting diode is coupled to said PWM signal generator and a collector of the phototransistor is coupled to said driver IC.

5. The circuit of claim 4, wherein the new PWM signal and the original PWM signal are in phase.

6. The circuit of claim 1, wherein the photocoupler is a packaged component in which a light-emitting diode and a phototransistor are packaged together, a cathode of the light-emitting diode is coupled to said PWM signal generator and an emitter of the phototransistor is coupled to said driver IC.

7. The circuit of claim 6, wherein the new PWM signal and the original PWM signal are out of phase.

8. A control circuit comprising:
    a pulse width modulation signal generator for generating a first series of pulses having a first voltage range and a first duty cycle;
    an output terminal for outputting a second series of pulses in response to the first series of pulses, the second series of pulses having a second voltage range different from the first voltage range and having a second duty cycle the same as the first duty cycle;
    a driver integrated circuit connected with the output terminal;
    a motor connected to an output of the driver integrated circuit; and
    a photocoupler interconnecting the pulse width modulation signal generator and the output terminal.

9. The control circuit of claim 8, wherein the first series of pulses is totally in phase with the second series of pulses.

10. The control circuit of claim 8, wherein the first series of pulses is totally out of phase with the second series of pulses.

11. The control circuit of claim 9, wherein the output terminal is connected with a power source for generating the second voltage range and a collector of a phototransistor of the photocoupler.

12. The control circuit of claim 10, wherein the output terminal is connected with a ground and an emitter of a phototransistor of the photocoupler.

13. The control circuit of claim 11, wherein the photocoupler comprises a light-emitting diode having a cathode connecting with the pulse width modulation signal generator and an anode connecting with a power source for controlling ON/OFF switch of the light-emitting diode.

14. The control circuit of claim 12, wherein the photocoupler comprises a light-emitting diode having a cathode connecting with the pulse width modulation signal generator and an anode connecting with a power source for controlling ON/OFF switch of the light-emitting diode.

* * * * *